United States Patent
Ichii et al.

(10) Patent No.: US 8,693,833 B2
(45) Date of Patent: Apr. 8, 2014

(54) MANUFACTURING METHOD FOR OPTICAL FIBER PREFORM AND OPTICAL FIBER

(75) Inventors: Kentaro Ichii, Sakura (JP); Shoji Tanigawa, Sakura (JP)

(73) Assignee: Fujikura Ltd., Toyko (JP)

( * ) Notice: Subject to any disclaimer, the term of this patent is extended or adjusted under 35 U.S.C. 154(b) by 227 days.

(21) Appl. No.: 13/243,092

(22) Filed: Sep. 23, 2011

(65) Prior Publication Data

US 2012/0014653 A1 Jan. 19, 2012

Related U.S. Application Data

(63) Continuation of application No. PCT/JP2010/002153, filed on Mar. 26, 2010.

(30) Foreign Application Priority Data

Mar. 26, 2009 (JP) ................................. 2009-075321

(51) Int. Cl.
G02B 6/02 (2006.01)
(52) U.S. Cl.
USPC .......................................................... 385/123
(58) Field of Classification Search
None
See application file for complete search history.

(56) References Cited

U.S. PATENT DOCUMENTS

| | | | | |
|---|---|---|---|---|
| 2008/0013904 | A1* | 1/2008 | Nishihara et al. | 385/123 |
| 2009/0123121 | A1* | 5/2009 | Dong et al. | 385/124 |
| 2010/0329618 | A1* | 12/2010 | Dong et al. | 385/127 |

FOREIGN PATENT DOCUMENTS

| | | |
|---|---|---|
| JP | 59-217636 A | 12/1984 |
| JP | 59-217636 A | 12/1984 |
| JP | 4-59254 B2 | 9/1992 |
| JP | 4-59254 B2 | 9/1992 |
| JP | 2931026 B2 | 8/1999 |
| JP | 2931026 B2 | 8/1999 |
| JP | 2003-137542 A | 5/2003 |
| JP | 2003-137542 A | 5/2003 |
| JP | 2003-238189 A | 8/2003 |
| JP | 2003-238189 A | 8/2003 |

OTHER PUBLICATIONS

International Search Report for PCT/JP2010/002153 dated Apr. 14, 2010.
I. Kasik et al., "Properties and Fabrication of Ytterbium-Erbium Co-Doped Silica Fibres for High-Power Fibre Lasers," pp. 457-465; IPO Publishing Ltd.; Pure Appl. Opt. 7 (1998).
V. Matejec et al., "Properties of Optical Fiber Preforms Prepared by Inner Coating of Substrate Tubes," 2001, Ceramics—Silikaty pp. 62-69; 45 (2).
J. Dawson et al., "Large Flattened Mode Optical Fiber for Reduction of Non-Linear Effects in Optical Fiber Lasers," Proceedings of SPIE; 2004; pp. 132-139; vol. 5335.

(Continued)

Primary Examiner — Tina Wong
(74) Attorney, Agent, or Firm — Sughrue Mion, PLLC

(57) ABSTRACT

Provided is a manufacturing method for an optical fiber preform of which the core is doped with a rare earth element. The method includes: depositing glass particles within a silica tube by the modified chemical vapor deposition method, the glass particles mainly consisting of silicon dioxide; adding the rare earth element and aluminum to the glass particles within the silica tube by the solution doping method; heating the silica tube while flowing a phosphorous-containing gas into the silica tube to sinter the glass particles within the silica tube while adding the phosphorous; and heating and collapsing the silica tube to which the rare earth element, the aluminum, and the phosphorous are added.

6 Claims, 4 Drawing Sheets

(56) References Cited

OTHER PUBLICATIONS

International Search Report for PCT/JP2010/002153 dated Apr. 27, 2010.
J. Dawson et al., "Large Flattened Mode Optical Fiber for Reduction of Non-Linear Effects in Optical Fiber Lasers," pp. 132-139; Proceedings of SPIE vol. 5335; 2004.
V. Matejec et al., "Properties of Optical Fiber Preforms Prepared by Inner Coating of Substrate Tubes," pp. 62-69; Ceramics—Silikaty 45 (2) (2001).
Notice of Reasons for Rejection issued by the Japanese Patent Office in application No. 2009-075321, dated Sep. 3, 2013.
V. Matejec et al., "Preparation of Optical Cores of Silica Optical Fibers by the Sol-Gel Method," pp. 889-893; Journal of Sol-Gel Science and Technology 8; 1997.

* cited by examiner

MANUFACTURING METHOD FOR OPTICAL FIBER PREFORM AND OPTICAL FIBER

CROSS REFERENCE TO RELATED APPLICATIONS

This application is a continuation application based on a PCT Patent Application No. PCT/JP2010/002153, filed Mar. 26, 2010, whose priority is claimed on Japanese Patent Application No. 2009-075321 filed Mar. 26, 2009, the entire content of which are hereby incorporated by reference.

BACKGROUND OF THE INVENTION

1. Field of the Invention

The present invention relates to an optical fiber of which the core is co-doped with at least a rare earth element, phosphorous, and aluminum, and a manufacturing method for an optical fiber preform that is suitable for the manufacture thereof.

2. Description of the Related Art

As a factor that interferes with the performance of a fiber amplifier and a fiber laser, a phenomenon called a non-linear optical effect is known. This phenomenon occurs when the power of light that propagates through the core of an optical fiber is fairly high, and gives rise to problems such as wavelength conversion of light. For example, in a high-output fiber laser of which the output light power exceeds several tens of Watts, the occurrence of stimulated Raman scattering, which is a type of non-linear optical effect, generates light with a wavelength that is somewhat longer than the wavelength of the output light. As a result of this light being amplified, the spectrum width of the output light is disadvantageously widened. Therefore, it is important to design an optical fiber so as to inhibit the generation of non-linear optical effects represented by stimulated Raman scattering.

In general, a non-linear constant $\gamma$ of an optical fiber is given by the following Equation (1).

$$\gamma = (2\pi/\lambda) \times (n_2/A_{eff}) \quad (1)$$

In Equation (1), $\lambda$ is the wavelength, $n_2$ is the non-linear refractive index, and $A_{eff}$ is the effective cross-sectional area. As is clear from Equation (1), it is effective to increase $A_{eff}$ in order to inhibit the generation of the non-linear optical effects.

On the other hand, the following is known with regard to the relationship between the distribution of the relative refractive index difference of the optical fiber and the $A_{eff}$. FIG. 6 to FIG. 8 show the distribution profile of the relative refractive index difference in the radial cross-section of the core of an optical fiber. In the figures, the horizontal axis denotes the radial position, and the vertical axis denotes the relative refractive index difference (%). The size of the $A_{eff}$ is in the relationship of "optical fiber of FIG. 6 > optical fiber of FIG. 7 > optical fiber of FIG. 8" given that the core diameter and the relative refractive index difference are the same throughout (refer to Proceedings of the SPIE, Vol. 5335, pp. 132-139 (2004)). As shown in FIG. 6 and FIG. 7, as the distribution profile of the relative refractive index difference becomes closer to a rectangle, the electric-field distribution of light that propagates through the core of the optical fiber becomes broader, and $A_{eff}$ thus becomes greater. On the other hand, as shown in FIG. 8, as the distribution profile of the relative refractive index difference becomes closer to a bell shape, $A_{eff}$ becomes smaller. Here, the "relative refractive index difference ($\Delta$)" is expressed by Equation (2) given below. In Equation (2), $n_{core}$ denotes the refractive index of the core, while $n_{clad}$ denotes the refractive index of the cladding.

$$\Delta(\%) = (n_{core} - n_{clad})/n_{core} \times 100 \quad (2)$$

For example, as a method of manufacturing an optical fiber preform by adding ytterbium (Yb) as a rare earth element, a method is known in which glass particles that consist of silicon dioxide ($SiO_2$) are deposited in a silica tube by the modified chemical vapor deposition method, and Yb and Al are added by the solution doping method using an aqueous solution that includes Yb and aluminum (Al). The distribution profile of the relative refractive index difference of the optical fiber preform that is manufactured by the method is normally a bell shape as shown in FIG. 8. This is because the bulk density of the glass particles varies in the radial direction if the glass particles are deposited by the modified chemical vapor deposition method. In the modified chemical vapor deposition method, since the silica tube is heated from the outer wall surface, as the position becomes closer to the inner wall surface of the silica tube, the temperature becomes higher and the bulk density of the glass particles becomes greater. On the other hand, as the position becomes closer to the center of the silica tube, the temperature becomes lower and the bulk density becomes lower. In the solution doping method, the lower the bulk density of the glass particles (i.e., the higher the porosity), the higher the doping amount of the dopant. Accordingly, when Yb and Al are added using the solution doping method, the distribution profile of the relative refractive index difference becomes bell shaped as shown in FIG. 8.

As mentioned above, as a method of manufacturing a rare earth doped optical fiber preform, a method is known in which glass particles are deposited in a silica tube by the modified chemical vapor deposition method, and a rare earth element is added to the glass particles by the solution doping method. In addition, a method is known in which aluminum is co-doped in order to inhibit clustering of the rare earth ions. As methods of aluminum co-doping, a method of using the solution doping method (refer to Japanese Patent No. 2931026), and a method of using the modified chemical vapor deposition method in which $AlCl_3$ gas is allowed to flow into a silica tube when depositing glass particles on the silica tube (refer to Japanese Unexamined Patent Application, First Publication No. 2003-137542).

On the other hand, as a phosphorous (P) co-doping method, a method of using the modified chemical vapor deposition method is disclosed in which $POCl_3$ gas is allowed to flow into a silica tube when depositing glass particles on the silica tube (refer to Japanese Examined Patent Application No. H04-059254).

As mentioned above, the methods of adding a rare earth element, Al and P, when manufacturing an optical fiber preform, have already been disclosed. Then, after adding the desired dopant using both the modified chemical vapor deposition method and the solution doping method as described above, it is necessary to heat the silica tube to sinter the glass particles. However, the relationship between the steps of adding each dopant and the characteristics of the optical fiber preform and optical fiber when co-doping a rare earth element, Al and P is not known in detail. As matters stand, an optimal manufacturing method of an optical fiber that can suppress the generation of non-linear optical effects when used in a fiber amplifier and fiber laser has not been disclosed.

The present invention was conceived in view of the above circumstances, and the object thereof is to provide an optical fiber in which the concentration of a rare earth element is easily controlled, the effective cross-sectional area ($A_{eff}$) is large and non-linear optical effects when used in a fiber amplifier and fiber laser can be effectively suppressed, and a manufacturing method of an optical fiber preform that is suitable for manufacturing the optical fiber.

SUMMARY

In order to solve the aforementioned problems, the present invention employs the following.

In particular, a first aspect of the present invention is a manufacturing method for an optical fiber preform of which the core is doped with a rare earth element, the method including: depositing glass particles within a silica tube by the modified chemical vapor deposition method, the glass particles mainly consisting of silicon dioxide; adding the rare earth element and aluminum to the glass particles within the silica tube by the solution doping method; heating the silica tube while flowing a phosphorous-containing gas into the silica tube to sinter the glass particles within the silica tube while adding the phosphorous; and heating and collapsing the silica tube to which the rare earth element, the aluminum, and the phosphorous are added.

In the solution doping method, it is preferable that, in the solution doping method, ytterbium and the aluminum be added to the glass particles using an aqueous solution of ytterbium trichloride and aluminum trichloride, or ytterbium trichloride and aluminum trichloride hexahydrate.

It is preferable that the phosphorus-containing gas be phosphorus oxychloride gas.

A second aspect of the present invention is an optical fiber obtained by drawing the optical fiber preform that is manufactured by the above-described method, wherein in the radial cross section of the core, there is no region in which the concentration of aluminum oxide is higher than the concentration of diphosphorus pentaoxide, or a region in which the concentration of diphosphorus pentaoxide is higher than the concentration of aluminum oxide is larger than the region in which the concentration of aluminum oxide is higher than the concentration of diphosphorus pentaoxide.

It is preferable that in the radial cross section of the core, in a region in which at least one of the concentration of diphosphorus pentaoxide and the concentration of aluminum oxide is 0.5 mol percent or higher, when a region on the inner side in the radial direction wherein the difference between the concentration of diphosphorus pentaoxide and the concentration of aluminum oxide is less than 0.5 mol percent is defined as a first region, and a region being outside of the first region in the radial direction in which the difference between the concentration of diphosphorus pentaoxide and the concentration of aluminum oxide is equal to or greater than 0.5 mol percent is defined as a second region, the ratio of the second region to the total of the first region and the second region be 50 percent or greater.

It is preferable that, in the first region, the concentration of diphosphorus pentaoxide and the concentration of aluminum oxide be substantially the same.

According to the present invention, it is possible to provide an optical fiber in which the concentration of a rare earth element is easily controlled, the effective cross-sectional area ($A_{eff}$) is large and non-linear optical effects when used in a fiber amplifier and fiber laser can be effectively suppressed, and a manufacturing method of an optical fiber preform that is suitable for manufacturing the optical fiber.

DESCRIPTION OF THE PREFERRED EMBODIMENTS

Figure 1:
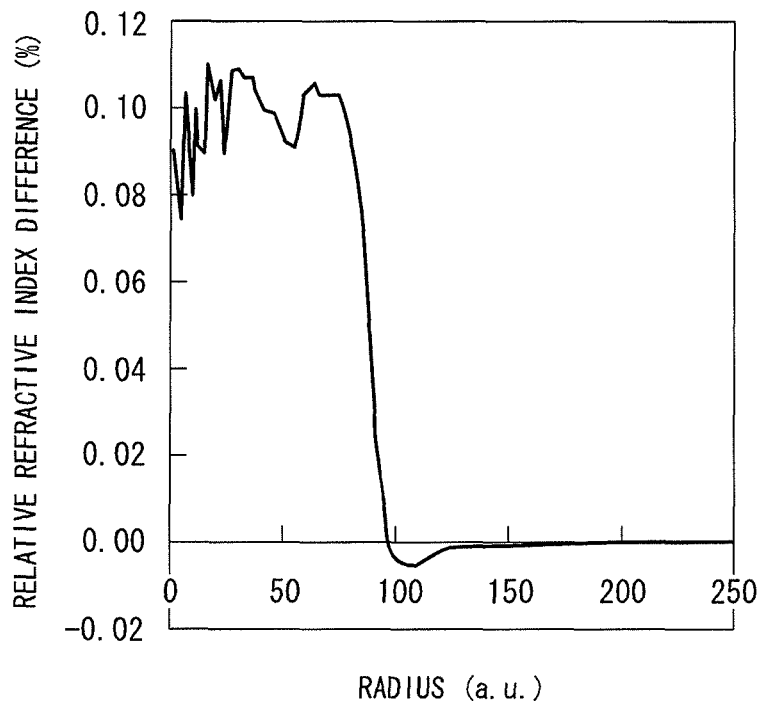
FIG. 1 is a graph that shows the result of measuring the relative refractive index difference in the radial cross section of the optical fiber preform manufactured in Example 1.

Hereinbelow, embodiments of the present invention shall be described in detail.

Note that, in the optical fiber preform and optical fiber shown below, each value of the concentrations of the dopants and the relative refractive index differences unless otherwise noted, is an average of values at regions (10 locations) that are equidistant from the center of the core, in the radial cross section.

<Manufacturing Method of Optical Fiber Preform>

The manufacturing method of an optical fiber preform of the present invention is a manufacturing method of an optical fiber preform of which the core is doped with a rare earth element, the method including: depositing glass particles (soot) within a silica tube by the modified chemical vapor deposition method, the glass particles mainly consisting of silicon dioxide (hereinbelow, abbreviated as the soot deposition step); adding the rare earth element and aluminum to the glass particles within the silica tube by the solution doping method (hereinbelow abbreviated as the solution doping step); heating the silica tube while flowing a phosphorous-containing gas into the silica tube to sinter the glass particles within the silica tube while adding the phosphorous (hereinbelow abbreviated as the sintering step); and heating and collapsing the silica tube to which the rare earth element, the aluminum, and the phosphorous are added (hereinbelow referred to as the collapsing step).

(Soot Deposition Step)

In the soot deposition step, glass particles (soot) that mainly consist of silicon dioxide ($SiO_2$) are deposited in a silica tube by the modified chemical vapor deposition method. The modified chemical vapor deposition method may be performed by an ordinary method. It should be noted that, in the present embodiment, "glass that mainly consists of silicon dioxide" is "silica glass". Moreover, "deposited in a silica tube" means "deposited on the inner surface of a silica tube".

In the soot deposition step, for example it is possible to simultaneously add aluminum (Al) and phosphorous (P) in a gaseous phase to glass particles. Generally, aluminum trichloride ($AlCl_3$) gas is used when adding Al, and phosphorous oxychloride ($POCl_3$) gas is used when adding P. However, when adding Al or P in this way, it is necessary to adjust the flow rates of the $AlCl_3$ gas and the $POCl_3$ gas that are source material gases in order to control the dosages. If the flow rate of a gas changes, the bulk density of the deposited glass particles also changes greatly, and so the concentration of the rare earth element that is being added in the solution doping step varies. As a result, it is difficult to control the concentration of the rare earth element in the core to the desired value. Moreover, in order to prevent crystallization from the source material gas, it is necessary to prevent condensation of the $AlCl_3$ gas in the gas transportation line. In order to prevent condensation of this $AlCl_3$ gas, it is necessary to heat the gas transportation line and maintain it at a high temperature. As a result, the manufacturing device becomes complicated, and the manufacturing cost increases.

Therefore, in the present invention, the glass particles are deposited without performing the addition of dopants such as Al and P in the soot deposition step.

(Solution Doping Step)

In the solution doping step, a rare earth element and Al are added to the glass particles that have been deposited in the silica tube by the solution doping method.

The rare earth element may be suitably selected in accordance with the intended use, and examples include ytterbium (Yb), erbium (Er), thulium (Tm), yttrium (Y), holmium (Ho), samarium (Sm), praseodymium (Pr), neodymium (Nd), and the like. One of these rare earth elements may used independently, or two or more of them may be used in combination. In the present invention, in consideration of manufacturing an optical fiber from the manufactured optical fiber preform, and subsequently constituting a fiber amplifier or fiber laser, Yb is particularly preferred.

As for the solution doping method, a well-known method may be used. For example, an aqueous solution of a source material compound that contains a rare earth element or Al is prepared, and the silica tube on which glass particles are deposited may be immersed in the solution for a predetermined time. As the source material compound for the rare earth element, a rare earth chloride is preferable. For example, in the case of the rare earth element being Yb, ytterbium trichloride ($YbCl_3$) is preferable. Meanwhile, as a source material compound for Al, $AlCl_3$ or aluminum trichloride hexahydrate ($AlCl_3.6H_2O$) is preferable.

Since the vapor pressure of a source material compound for a rare earth element is usually low, it is extremely difficult to add it in the gaseous phase in a silica tube. Accordingly, it is extremely difficult to control the concentration of the rare earth element in the core to the desired value. Therefore, in the present invention, the rare earth element is added by the solution doping method.

Moreover, the vaporization temperature of the source material compound for Al is comparatively low. For example, if $AlCl_3$ is heated to around 200° C., it is possible to allow it to easily flow into the silica tube in the gaseous phase. However, in order to control the concentration of Al in the core to the desired value, as stated in the soot deposition step, it is necessary to heat the gas transportation line and maintain it at a high temperature. This is true for the sintering step described below. Therefore, in the present invention, in order to control the concentration of Al, Al is not added in the gaseous phase but rather added by the solution doping method.

The amount of the rare earth element and Al added to the glass particles in a silica tube can be adjusted by adjusting the concentration of the source material compound in the solutions of these source material compounds to be used in the solution doping method.

In the solution doping step, in the solutions of the source material compounds to be used, a compound that causes precipitation by interacting with the source material compound for a rare earth element or the source material compound for Al cannot be used in combination. Therefore, a dopant of which the source material compound produces such precipitate cannot be added in the solution doping step. For example, phosphoric acid ($H_3PO_4$) that is used as a source material compound for P produces precipitate such as aluminum phosphate ($AlPO_4$) that is poorly soluble at room temperature (has a high melting point) due to the interaction with $AlCl_3$ in the aqueous solution. Moreover, $POCl_3$ is also dissolved and becomes $H_3PO_4$ in an aqueous solution. Accordingly, in the present invention, P is not added by the solution doping method.

After the immersion, it is preferable to take out the silica tube and to dry the glass particles in the silica tube. As the method of drying, it is preferable to continuously flow a gas such as oxygen gas into the silica tube.

(Sintering Step)

In the sintering step, by heating the silica tube while flowing gas that includes phosphorous into the silica tube in which a rare earth element and Al has been added to the glass particles, the glass particles in the silica tube are sintered while being doped with phosphorous.

As for the sintering, a well-known method may be used except for allowing a gas that includes phosphorous to flow thereinto.

As the gas that includes phosphorous, $POCl_3$ is preferable. The vaporization temperature of $POCl_3$ is low, and so it is possible to allow it to flow into the silica tube easily in the gaseous phase.

It should be noted that, in the sintering step, unlike the soot deposition step, concentration control of the rare earth element does not become difficult even if the flow rate of the gas that includes the phosphorous is adjusted.

In this way, since phosphorous is suitable for doping in the gaseous phase but not suitable for doping in the solution doping step, phosphorous is added in the sintering step in the present invention.

(Collapsing Step)

In the collapsing step, the silica tube to which the rare earth element, Al and P are added is heated and collapsed. A well-known method may be used for the collapsing besides using the silica tube. By performing the collapsing step, the optical fiber preform is obtained.

As described above, in the present invention, by adding the rare earth element and Al in the solution doping step, and adding P in the sintering step, respectively, it is possible to control the concentration distribution of Al and the concentration distribution of P in the optical fiber preform. For example, it is possible to check the concentration distribution of Al based on the concentration distribution of aluminum oxide ($Al_2O_3$) and possible to check the concentration distribution of P based on the concentration distribution of diphosphorus pentaoxide ($P_2O_5$).

In the optical fiber preform manufactured by the present invention, in the radial cross section of the core, it is preferable that there be no region in which the concentration of $Al_2O_3$ is higher than the concentration of $P_2O_5$ (hereafter abbreviated as a region of high aluminum concentration), or a region in which the concentration of $P_2O_5$ is higher than the concentration of $Al_2O_3$ (hereinafter abbreviated as a region of high phosphorous concentration) is larger than the region of high aluminum concentration. Moreover, in the radial cross section of the core, in a region in which at least one of the concentration of $P_2O_5$ and the concentration of $Al_2O_3$ is 0.5 mol percent or higher, when a region on the inner side in the radial direction wherein the difference between the concentration of $P_2O_5$ and the concentration of $Al_2O_3$ is less than 0.5 mol percent is defined as a first region, and a region being outside of the first region in the radial direction in which the difference between the concentration of $P_2O_5$ and the concentration of $Al_2O_3$ is equal to or greater than 0.5 mol percent is defined as a second region, the ratio of the second region to the total of the first region and the second region is preferably 50% or greater, more preferably 60% or greater. By doing so, the distribution profile of the relative refractive index difference becomes close to a rectangle, leading to favorable properties.

Moreover, in the radial cross section of the core, in the first region, it is preferable that the difference between the $P_2O_5$ concentration and the $Al_2O_3$ concentration be less, and more preferable that the $P_2O_5$ concentration and the $Al_2O_3$ concentration be substantially the same. In such a region, P and Al mutually negate a rise in the refractive index, and the relative refractive index difference becomes close to that of $SiO_2$.

Figure 6:
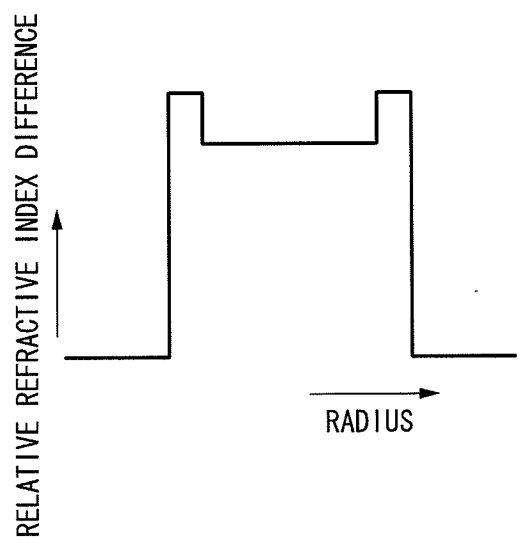
FIG. 6 is a graph that shows an example of the distribution profile of the relative refractive index difference in the radial cross section of the core of an optical fiber in which effective cross-sectional area ($A_{eff}$) is large.
Figure 7:
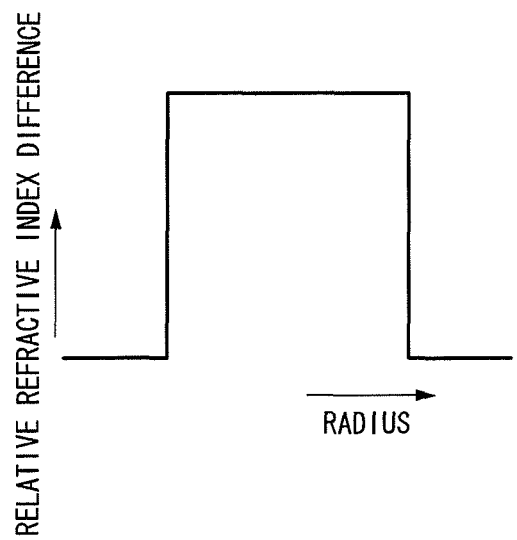
FIG. 7 is a graph that shows another example of the distribution profile of the relative refractive index difference in the radial cross section of the core of an optical fiber in which effective cross-sectional area ($A_{eff}$) is large.

Since the optical fiber preform manufactured by the present invention has the concentration distribution for dopants as described above, the distribution profile of the relative refractive index difference of the core in the radial cross section becomes close to a rectangle as shown in FIG. 6 and FIG. 7, and therefore exhibiting favorable properties.

tioned Equation (2) may be reduced, and the core diameter may be increased as described above. Thereby, both single-mode propagation or few-mode propagation, and suppression of non-linear optical effects may be achieved.

The optical fiber of the present invention has a concentration distribution of dopants in the radial cross section and a distribution profile of the relative refractive index difference that are the same as the optical fiber preform.

That is, in the optical fiber of the present invention, the distribution profile of the relative refractive index difference becomes close to a rectangular shape as in FIG. 6 or FIG. 7, the electric field distribution of light that propagates through the core of the optical fiber broadens, and $A_{eff}$ increases. Accordingly, it is possible to manufacture a fiber amplifier and fiber laser in which the generation of non-linear optical effects such as stimulated Raman scattering is effectively suppressed. In addition, the concentration of the rare earth element is easily controlled.

EXAMPLES

Hereinbelow, further detail will be described with regard to the present invention with reference to specific examples. Note that the present invention is not limited to the following examples.

Table 1 shows the adding step of each dopant in manufacturing the optical fiber preform, and the optical properties of the obtained optical fiber preform. The details will be explained in sequence below.

TABLE 1

| | Steps | | | Distribution Shape of Relative | Controllability of |
|---|---|---|---|---|---|
| | Soot Deposition | Solution Doping | Sintering | Refractive Index Difference | Yb Concentration |
| Embodiment 1 | — | Yb, Al | P | Good (rectangular) | Good |
| Comparative Example 1 | — | Yb | Al, P | Bad (bell shape) | Good |
| Comparative Example 2 | Al | Yb | P | Bad (bell shape) | Poor |
| Comparative Example 3 | P | Yb, Al | — | Good (rectangular) | Poor |
| Comparative Example 4 | Al, P | Yb | — | Bad (bell shape) | Bad |
| Comparative Example 5 | P | Yb | Al | Bad (bell shape) | Poor |
| Comparative Example 6 | — | Yb, Al, P | — | Unevaluable due to precipitation of $AlPO_4$ | |
| Comparative Example 7 | Al | Yb, P | — | Unevaluable because P cannot be added at high concentration | |
| Comparative Example 8 | — | Yb, P | Al | Unevaluable because P cannot be added at high concentration | |

Note that in Table 1, the evaluation criteria of "controllability of Yb concentration" is as follows:
Good: Reproducibility is good and control is easy.
Poor: Reproducibility is bad and control is difficult.
Bad: Reproducibility is extremely bad and control is impossible.

<Optical Fiber>

In the optical fiber according to the present invention that is obtained by drawing the optical fiber preform manufactured by the method of the present invention, there is no region of high Al concentration, or the region of high P concentration is larger than the region of high Al concentration in the radial cross section of the core.

As for the drawing of the optical fiber preform, a well-known method may be used.

The core diameter of the optical fiber of the present invention is preferably 20 to 35 μm, and more preferably 25 to 30 μm.

In a fiber laser, it is preferable to allow single-mode propagation or few-mode spread in the core in order to improve the beam quality of the output light. For that, the relative refractive index difference that is represented by the aforemen- <Manufacture of Optical Fiber Preform>

Example 1

$SiO_2$ glass particles (soot) were deposited in a silica tube by the modified chemical vapor deposition method.

Then, Yb and Al were added to the $SiO_2$ glass particles by the solution doping method. Specifically, the silica tube in which $SiO_2$ glass particles were deposited was immersed for 3 hours in a solution of $YbCl_3$ and $AlCl_3.6H_2O$ dissolved in pure water. After removing the solution, the $SiO_2$ glass particles were dried for 6 hours by continuously flowing oxygen gas into the silica tube.

After that, the silica tube was heated with an oxy-hydrogen burner in which $POCl_3$ was flowed into the silica tube while bubbling $POCl_3$ with oxygen gas, and the $SiO_2$ glass particles were sintered while adding the P.

Subsequently, while adjusting the internal pressure of the silica tube, the silica tube was heated to an even higher temperature with the oxy-hydrogen burner and collapsed, and a solid optical fiber preform was manufactured.

Figure 2:
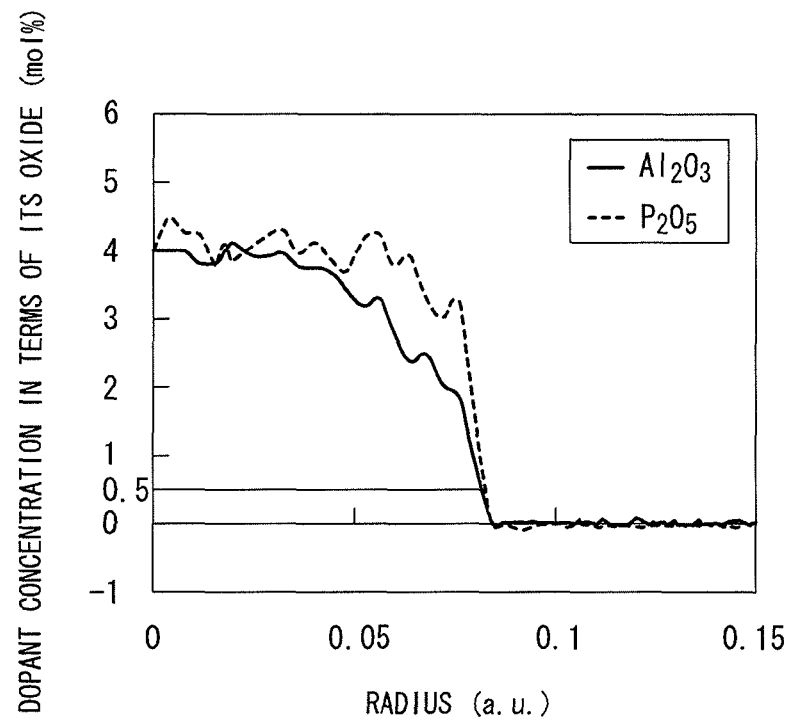
FIG. 2 is a graph that shows the result of analyzing the concentration distributions of $Al_2O_3$ and $P_2O_5$ in the radial cross section of the optical fiber preform manufactured in Example 1.

Using a preform analyzer, the distribution profile of the relative refractive index difference in the radial cross section of the obtained optical fiber preform was measured. FIG. 1 shows the measurement result. In addition, the optical fiber preform was cut into round slices in the radial direction thereof, and a line analysis of the concentration distributions of $Al_2O_3$ and $P_2O_5$ in the radial cross section thereof was performed. FIG. 2 shows the analysis result. Note that FIG. 1 and FIG. 2 only show graphs corresponding to the radius of the core. The horizontal axis shows the position in the radial direction, with "0" being the center of the core. This is also the case for the subsequent graphs.

As a result, the distribution profile of the relative refractive index difference as shown in FIG. 1 resembles the distribution profile of FIG. 7, and is close to rectangular, which is good. Moreover, as shown in FIG. 2, the concentration distribution of $Al_2O_3$ and the concentration distribution of $P_2O_5$ differ, and the region of high P concentration is larger than the region of high Al concentration. Then, in the region where the concentration of $P_2O_5$ is 0.5 mol percent or higher (the region whose position in the radial direction is approximately 0 to 0.08), the first region on the inner side in the radial direction in which the difference between the $P_2O_5$ concentration and the concentration of $Al_2O_3$ is less than 0.5 mol percent is positioned about 0 to 0.05 in the radial direction, and the second region outside of the first region in the radial direction in which the difference between the concentration of $P_2O_5$ and the concentration of $Al_2O_3$ is equal to or greater than 0.5 mol percent is positioned about 0.05 to 0.08 in the radial direction. The ratio of the second region with respect to the total of the first region and the second region is approximately 61 percent. In the first region as shown here, the difference between the concentration of $P_2O_5$ and the concentration of $Al_2O_3$ is small, and the concentration of $P_2O_5$ and the concentration of $Al_2O_3$ are substantially the same.

Figure 3:
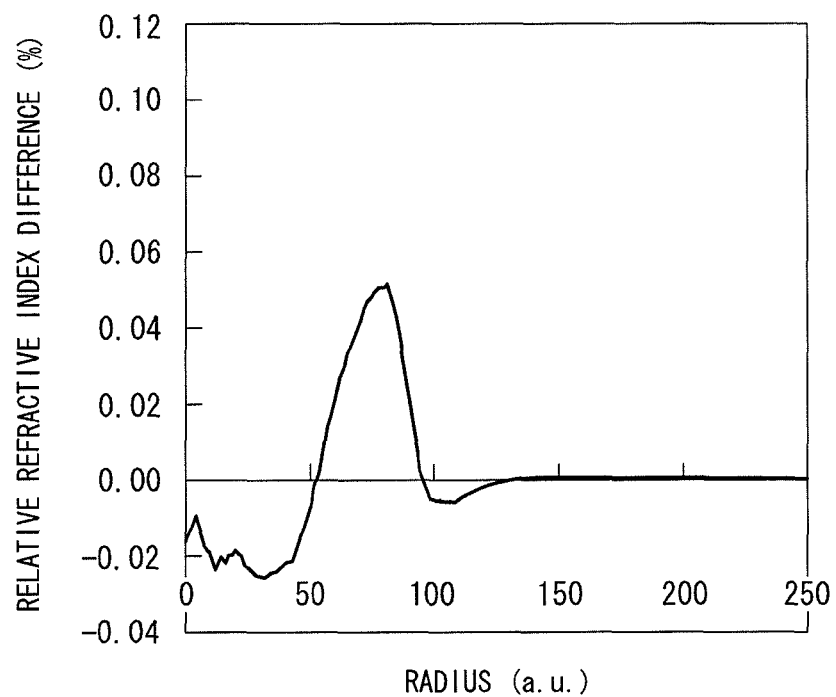
FIG. 3 is a graph that shows the distribution profile of the relative refractive index difference of the optical fiber preform that is manufactured by adding Al by the solution doping method and P by sintering without adding Yb.

In the region where $Al_2O_3$ and $P_2O_5$ are added at equimolar, they mutually negate an increase in the refractive index, and the refractive index becomes close to that of $SiO_2$. Moreover, in the region of high phosphorous concentration, excessive $P_2O_5$ contributes to a refractive-index rise. FIG. 3 is a graph that shows the distribution profile of the relative refractive index difference of the optical fiber preform that is manufactured by adding Al by the solution doping method and P by sintering, so that the concentration distribution of $Al_2O_3$ and the concentration distributions of $P_2O_5$ become the same as those in Example 1 (FIG. 2), without adding Yb. In the vicinity of the center of the region that contains $Al_2O_3$ and $P_2O_5$, since $Al_2O_3$ and $P_2O_5$ are contained at equimolar, the relative refractive index difference is substantially the same as that of $SiO_2$. Outside of the region that contains $Al_2O_3$ and $P_2O_5$, the relative refractive index difference rises due to excessive $P_2O_5$ contribution for the reason described above.

Figure 8:
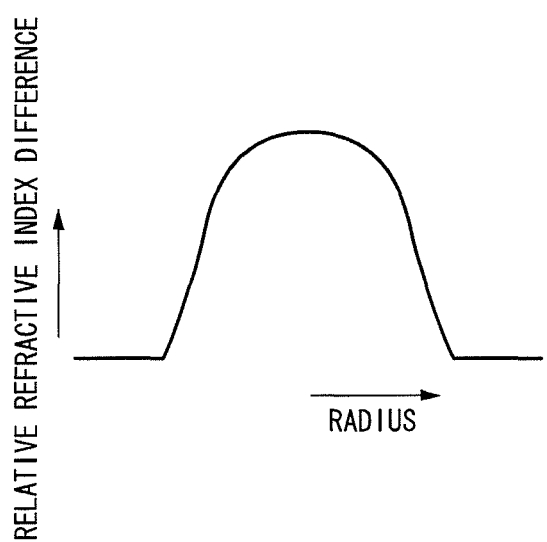
FIG. 8 is a graph that shows an example of the distribution profile of the relative refractive index difference in the radial cross section of the core of an optical fiber in which effective cross-sectional area ($A_{eff}$) is small.

On the other hand, in the optical fiber preform that is manufactured in which $Yb_2O_3$ is added by the solution doping method so that the concentration of $Yb_2O_3$ is the same as that in Example 1, the concentration distribution of $Yb_2O_3$ is a bell shape that resembles the concentration distribution of $Al_2O_3$ in Example 1. Since $Yb_2O_3$ is a dopant that causes the refractive index of $SiO_2$ glass to rise, the distribution of the relative refractive index difference has a bell shape as shown in FIG. 8. In addition, the summing together of the increase of the refractive index of $Yb_2O_3$ and the increase of the refractive index in FIG. 3 results in the distribution of the relative refractive index difference that is close to rectangular, as shown in FIG. 1.

Comparative Example 1

$SiO_2$ glass particles were deposited in a silica tube by the modified chemical vapor deposition method in the same way as Example 1.

Then, other than $AlCl_3 \cdot 6H_2O$ not being used, Yb was added to the $SiO_2$ glass particles by the solution doping method, and the $SiO_2$ glass particles were dried in the same way as Example 1.

After that, the silica tube was heated with an oxy-hydrogen burner while flowing $POCl_3$ into the silica tube by bubbling with oxygen gas and simultaneously while flowing $AlCl_3$ gas into the silica tube, and the $SiO_2$ glass particles were sintered while adding the P and the Al.

Subsequently, collapsing was performed by the same way as Example 1, and the optical fiber preform was manufactured.

Figure 4:
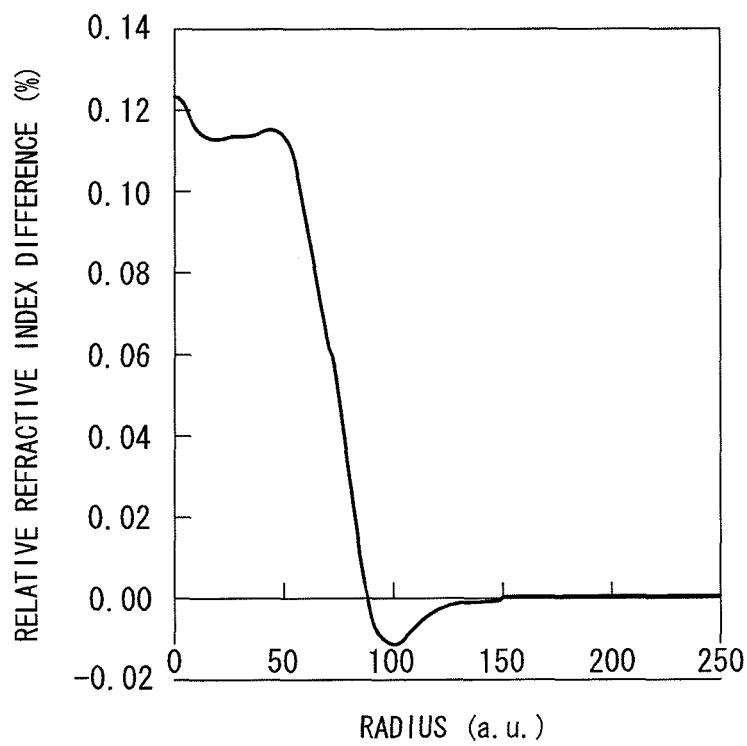
FIG. 4 is a graph that shows the result of measuring the relative refractive index difference of the optical fiber preform manufactured in Comparative Example 1.
Figure 5:
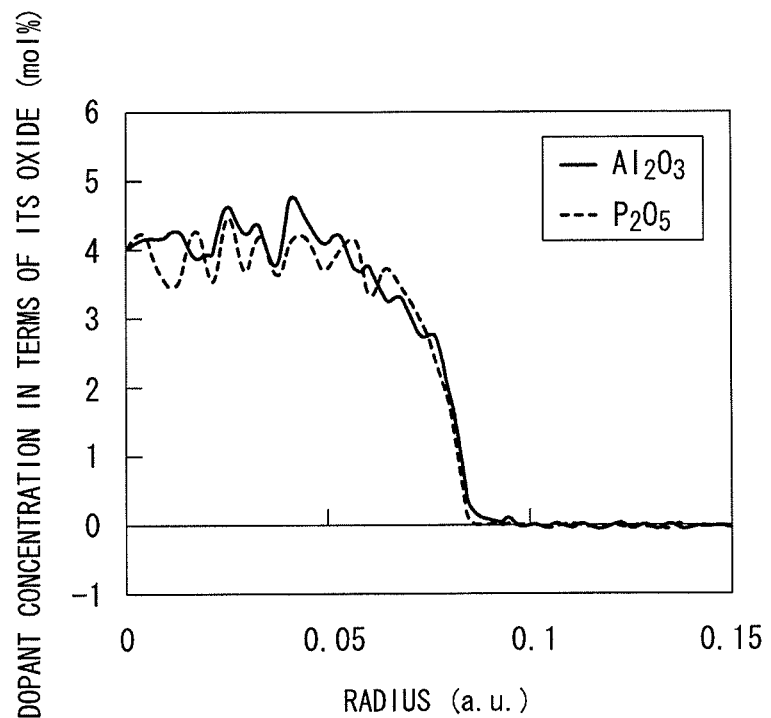
FIG. 5 is a graph that shows the result of analyzing the concentration distributions of $Al_2O_3$ and $P_2O_5$ by EPM in the radial cross section of the optical fiber preform manufactured in Comparative Example 1.

The distribution of the relative refractive index difference was measured for the obtained optical fiber preform in the same manner as Example 1, and a line analysis of the concentration distributions of $Al_2O_3$ and $P_2O_5$ were performed. The measurement result of the distribution of the relative refractive index difference is shown in FIG. 4, and the analysis result of the concentration distributions is shown in FIG. 5.

As a result, the distribution profile of the relative refractive index difference resembles the profile shown in FIG. 8, and is so close to a bell shape, which is not good. The concentration distribution of $Al_2O_3$ and the concentration distribution of $P_2O_5$ are nearly the same in the radial cross section, and they mutually negate an increase in the refractive index at any position in the radial direction. Since the $Yb_2O_3$ was added in the solution doping method, the concentration distribution of $Yb_2O_3$ has a similar pattern as the concentration distribution of $Al_2O_3$ in the optical fiber preform of Example 1, and is bell shaped. It is considered that the distribution profile of the relative refractive index difference is bell shaped as shown in FIG. 4 because $Yb_2O_3$ is a dopant that causes the refractive index of $SiO_2$ glass to rise.

In this way, the properties of the obtained optical fiber preform are not good. In addition, in this manufacturing method, since Al is added in the gaseous phase, it is necessary to maintain the gas transportation line at a high temperature. As a result, there are the problems of the manufacturing device becoming complicated, and the manufacturing cost increasing.

Comparative Example 2

Al doped $SiO_2$ glass particles were deposited in a silica tube by the modified chemical vapor deposition method. The Al was added in the gaseous phase by the method disclosed in Japanese Unexamined Patent Application, First Publication No. 2003-137542. That is, $SiO_2$ glass particles were deposited while flowing $AlCl_3$ gas into the silica tube.

Then, Yb was added to the $SiO_2$ glass particles by the solution doping method, and the $SiO_2$ glass particles were dried in the same way as Comparative Example 1.

After that, the $SiO_2$ glass particles were sintered while adding P in the same way as Example 1, and collapsing was performed in the same way as Example 1, whereby the optical fiber preform was manufactured.

Subsequently, the distribution of the relative refractive index difference of the obtained optical fiber preform was measured in the same manner as for Example 1, and a line analysis of the concentration distributions of $Al_2O_3$ and $P_2O_5$ were performed.

As a result, the distribution profile of the relative refractive index difference resembles a bell shape in the same manner as the case of Comparative Example 1, which is not good. The results regarding the concentration distribution of $Al_2O_3$ and the concentration distribution of $P_2O_5$ are similar to the case of Comparative Example 1, and so it is considered that the distribution profile of the relative refractive index difference is bell-shaped for the same reason as Comparative Example 1.

Moreover, in this manufacturing method, control of the Yb concentration of the optical fiber preform was difficult. The reason for this is thought to be variations of the concentration of $Yb_2O_3$ that is added in the solution doping method, stemming from the bulk density of the $SiO_2$ glass particles greatly changing with changing the flow rate of $AlCl_3$ gas in order to control the doping amount of Al in the soot deposition. In this way, there was a problem of not being able to control the Yb concentration with good reproducibility.

In addition, in this manufacturing method, since Al is added in the gaseous phase in a similar manner to the case of Comparative Example 1, it is necessary to maintain the gas transportation line at a high temperature. As a result, there are the problems of the manufacturing device becoming complicated, and the manufacturing cost increasing.

Comparative Example 3

P doped $SiO_2$ glass particles were deposited in a silica tube by the modified chemical vapor deposition method. The P was added by synthesizing the $SiO_2$ glass particles while flowing $POCl_3$ into the silica tube by bubbling with oxygen gas.

Then, Yb and Al were added to the $SiO_2$ glass particles by the solution doping method, and the $SiO_2$ glass particles were dried in the same way as Example 1.

After that, the silica tube was heated with an oxy-hydrogen burner without allowing $POCl_3$ and $AlCl_3$ gas to flow thereinto, and the $SiO_2$ glass particles were sintered.

Subsequently, collapsing was performed in the same way as Example 1, and the optical fiber preform was manufactured.

In addition, the distribution of the relative refractive index difference was measured for the obtained optical fiber preform in the same manner as Example 1, and a line analysis of the concentration distributions of $Al_2O_3$ and $P_2O_5$ were performed.

As a result, the distribution profile of the relative refractive index difference is close to rectangular, which is good. The results regarding the concentration distributions of $Al_2O_3$ and $P_2O_5$ are similar to the case of Example 1.

However, control of the Yb concentration of the optical fiber preform was difficult in this manufacturing method as well. That is, in the same way as the case of Comparative Example 2, the reason is thought to be variations of the concentration of $Yb_2O_3$ that is added in the solution doping method, stemming from the bulk density of the $SiO_2$ glass particles greatly changing with changing the flow rate of $POCl_3$ gas in order to control the doping amount of P in the soot synthesis. In this way, there was a problem of not being able to control the Yb concentration with good reproducibility.

Comparative Example 4

P and Al doped $SiO_2$ glass particles were deposited in a silica tube by the modified chemical vapor deposition method. At this time, P and Al were added by depositing $SiO_2$ glass particles while flowing $POCl_3$ into the silica tube by bubbling with oxygen gas and simultaneously flowing $AlCl_3$ gas into the silica tube.

Then, Yb was added to the $SiO_2$ glass particles by the solution doping method, and the $SiO_2$ glass particles were dried in the same way as Comparative Example 1.

After that, in the same way as Comparative Example 3, the silica tube was heated with an oxy-hydrogen burner without allowing $POCl_3$ gas or $AlCl_3$ gas to flow thereinto, and the $SiO_2$ glass particles were sintered.

Subsequently, collapsing was performed in the same way as Example 1, and the optical fiber preform was manufactured.

In addition, the distribution of the relative refractive index difference was measured for the obtained optical fiber preform in the same manner as Example 1, and a line analysis of the concentration distributions of $Al_2O_3$ and $P_2O_5$ were performed.

As a result, the distribution profile of the relative refractive index difference is close to a bell shape in the same manner as the case of Comparative Example 1, which is not good. The results regarding the concentration distributions of $Al_2O_3$ and $P_2O_5$ are similar to the case of Comparative Example 1.

Moreover, even in this manufacturing method, control of the Yb concentration of the optical fiber preform was difficult. Similarly to the cases of Comparative Example 2 or Comparative Example 3, the reason for this is thought to be changing the flow rate of the $POCl_3$ gas in order to control the doping amount of P and changing the flow rate of the $AlCl_3$ gas in order to control the doping amount of Al during soot deposition. In particular, in this manufacturing method, since both P and Al were added in the soot deposition, control of the Yb concentration was even more difficult than the case of Comparative Example 2 and Comparative Example 3. In this way, there was a problem of not being able to control the Yb addition concentration with good reproducibility.

In addition, in this manufacturing method, since Al is added in the gaseous phase in a similar manner to the case of Comparative Example 1 and Comparative Example 2, it is necessary to maintain the gas transportation line at a high temperature. As a result, there are the problems of the manufacturing device becoming complicated, and the manufacturing cost increasing.

Comparative Example 5

P doped $SiO_2$ glass particles were deposited in a silica tube by the modified chemical vapor deposition method in the same way as Comparative Example 3.

Then, Yb was added to the $SiO_2$ glass particles by the solution doping method, and the $SiO_2$ glass particles were dried in the same way as Comparative Example 1.

After that, the silica tube was heated with an oxy-hydrogen burner while flowing $AlCl_3$ gas into the silica tube, and the $SiO_2$ glass particles were sintered while adding Al.

Subsequently, collapsing was performed in the same way as Example 1, and the optical fiber preform was manufactured.

In addition, the distribution of the relative refractive index difference was measured for the obtained optical fiber preform in the same manner as Example 1, and a line analysis of the concentration distributions of $Al_2O_3$ and $P_2O_5$ were performed.

As a result, the distribution profile of the relative refractive index difference resembles a bell shape in the same manner as Comparative Example 1, which is not good. The results regarding the concentration distributions of $Al_2O_3$ and $P_2O_5$ are similar to the case of Comparative Example 1.

Moreover, in this manufacturing method, in the same manner as Comparative Example 3, there were problems of control of the Yb concentration of the optical fiber preform being difficult, and of not being able to control the Yb concentration with good reproducibility.

In addition, in this manufacturing method, since Al is added in the gaseous phase, it is necessary to maintain the gas transportation line at a high temperature. As a result, there are the problems of the manufacturing device becoming complicated, and the manufacturing cost increasing.

Comparative Example 6

The preparation of a liquid immersion solution was attempted in order to add Yb, Al and P, by the solution doping method, to the $SiO_2$ glass particles deposited in the silica tube. However, when $YbCl_3$, $AlCl_3.6H_2O$ and $H_3PO_4$ were added to pure water and agitated, a white precipitate was formed, and so the liquid immersion solution could not be prepared. The white precipitate is considered to be aluminum phosphate ($AlPO_4$).

Comparative Example 7

Al doped $SiO_2$ glass particles were deposited in a silica tube by the modified chemical vapor deposition method in the same way as Comparative Example 2.

Then, the silica tube was immersed in a solution that consists of $YbCl_3$ and $H_3PO_4$ dissolved in pure water in order to add Yb and P to the $SiO_2$ glass particles by the solution doping method, and then dried. Subsequently, the sintering of the $SiO_2$ glass particles and collapsing were performed. However, P could not be added to the desired sufficient concentration. The reason is not clear, but it was found that the solution doping method is not suitable for the addition of high concentrations of P.

Further, in this manufacturing method, since Al is added in the gaseous phase, it is necessary to maintain the gas transportation line at a high temperature. As a result, there are the problems of the manufacturing device becoming complicated, and the manufacturing cost increasing.

Comparative Example 8

$SiO_2$ glass particles were deposited in a silica tube by the modified chemical vapor deposition method in the same way as Example 1.

Then, Yb and P were added to the $SiO_2$ glass particles by the solution doping method and the $SiO_2$ glass particles were dried in the same way as Comparative Example 7. Subsequently, the sintering of the $SiO_2$ glass particles and collapsing were performed. However, similarly to Comparative Example 7, P could not be added to the desired sufficient concentration.

In addition, in this manufacturing method as well, since Al is added in the gaseous phase, it is necessary to maintain the gas transportation line at a high temperature. As a result, there are the problems of the manufacturing device becoming complicated, and the manufacturing cost increasing.

<Manufacture of Optical Fiber>

Example 2

Using the optical fiber preform manufactured in Example 1, an optical fiber whose core is co-doped with Yb, P and Al was manufactured. The details are as follows.

After forming the cladding layer by the outside vapor-deposition method using the optical fiber preform, it was processed by mechanical polishing so that the cross-sectional shape in the radial direction of the cladding layer became a regular heptagon.

Then, drawing was performed, and the outer circumference was coated with a resin having a low refractive index with a numerical aperture (NA) of 0.46. Further, the periphery thereof was coated with an ordinary high refractive index ultraviolet curable resin to obtain a double-cladding optical fiber.

The radial cross section of the obtained optical fiber shows a regular heptagonal shape, and the core diameter (diameter) was 26 µm. Meanwhile, the diameter of the inscribed circle of the regular heptagon that is the radial cross section of the cladding was approximately 400 nm. The cut-off wavelength was 1.69 µm, and the effective cross-sectional area ($A_{eff}$) was 393 µm$^2$. The bending loss when bent to a diameter of 150 mm was of a level posing no practical problems.

Comparative Example 9

Using the optical fiber preform manufactured in Comparative Example 1, an optical fiber was manufactured in the same way as Example 2 so as to have similar shape and size to those of Example 2. At this time, the cut-off wavelength was adjusted to be 1.69 µm.

The $A_{eff}$ of the obtained optical fiber was 288 µm$^2$. The bending loss when bent to a diameter of 150 mm was of a level posing no practical problems.

The $A_{eff}$ of the optical fibers of Example 2 and Comparative Example 9 significantly differ, with the difference being approximately 1.4 times, despite the cut-off wavelengths of both being the same. This is because the distribution profile of the relative refractive index difference of the optical fiber preform of Example 1 was closer to rectangular, and the electric field distribution of light that propagates through the core of the optical fiber became broader.

<Evaluation of Effect of Suppressing Stimulated Raman Scattering> [Test 1]

A fiber laser was configured to conduct a laser oscillation test in order to confirm the effect of suppressing stimulated Raman scattering of the optical fiber manufactured in Example 2. The details are as follows.

A pulsed seed light with a wavelength of 1060 nm and an average output of 1 W was launched into the optical fiber core, and pumping light with a wavelength of 915 nm and output of 50 W was launched into the cladding to amplify the light with a wavelength of 1060 nm. A filter that cuts light with a wavelength of 1100 nm or more was arranged at the emission port side of the optical fiber for amplification. When amplifying output light in the vicinity of the wavelength 1060 nm, the primary stimulated Raman scattering light is generated in the vicinity of a wavelength of 1110 nm. Moreover, the secondary stimulated Raman scattering light is generated in the vicinity of the wavelength 1160 nm. Therefore, the filter was arranged to cut the stimulated Raman scattering light from the output light and the output light in the vicinity of the wavelength 1060 nm was selectively extracted to suppress broadening of the wavelength of the output light. Thereby, it is possible to solve the problem of chromatic aberration that occurs when condensing, with a lens, the output light that includes light with unnecessary wavelengths. Such suppression of the broadening of the wavelength using a filter is a generally applicable method. When the power of the output light that was obtained through a filter in the aforementioned way was measured, it was 32 W.

[Test 2]

When the power of the output light that was obtained through a filter was measured in the same way as the method of Test 1 using the optical fiber manufactured in Comparative Example 9, the power was 27 W.

In the optical fiber of Comparative Example 9 that was manufactured using the optical fiber preform of Comparative Example 1, since $A_{eff}$ is small, much stimulated Raman scattering is produced, and so the width of the wavelength of the output light broadens. For this reason, the light of long wavelengths was cut by the filter, and the power of the output light decreased.

On the other hand, since the distribution profile of the relative refractive index difference in the optical fiber preform of Example 1 is close to a rectangle, the generation of stimulated Raman scattering was suppressed in the optical fiber of Example 2 that is manufactured using the preform of Example 1. For that reason, a fiber laser was produced in which broadening of the wavelength width was suppressed and the energy conversion efficiency was high.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

According to the present invention, it is possible to provide an optical fiber in which the concentration of a rare earth element is easily controlled, the effective cross-sectional area ($A_{eff}$) is large and the effects of non-linear optical effects can be effectively suppressed in a fiber amplifier and fiber laser, and a manufacturing method of an optical fiber preform that is suitable for manufacturing the optical fiber.

What is claimed is:

1. A manufacturing method for an optical fiber preform of which the core is doped with a rare earth element, the method comprising:
   depositing glass particles within a silica tube by a modified chemical vapor deposition method, the glass particles mainly comprising silicon dioxide and containing no phosphorus;
   adding the rare earth element and aluminum to the glass particles within the silica tube by a solution doping method;
   heating the silica tube while flowing a phosphorous-containing gas into the silica tube to sinter the glass particles within the silica tube while adding the phosphorous; and
   heating and collapsing the silica tube to which the rare earth element, the aluminum, and the phosphorous are added.

2. The manufacturing method for an optical fiber preform according to claim 1, wherein, in the solution doping method, ytterbium and the aluminum are added to the glass particles using an aqueous solution of ytterbium trichloride and aluminum trichloride, or ytterbium trichloride and aluminum trichloride hexahydrate.

3. The manufacturing method for an optical fiber preform according to claim 1, wherein the phosphorus-containing gas is phosphorus oxychloride gas.

4. An optical fiber obtained by drawing the optical fiber preform that is manufactured by the method according to claim 1, wherein
   in the radial cross section of the core, there is no region in which the concentration of aluminum oxide is higher than the concentration of diphosphorus pentaoxide, or a region in which the concentration of diphosphorus pentaoxide is higher than the concentration of aluminum oxide is larger than the region in which the concentration of aluminum oxide is higher than the concentration of diphosphorus pentaoxide.

5. The optical fiber according to claim 4, wherein
   in the radial cross section of the core, in a region in which at least one of the concentration of diphosphorus pentaoxide and the concentration of aluminum oxide is 0.5 mol percent or higher, when a region on the inner side in the radial direction wherein the difference between the concentration of diphosphorus pentaoxide and the concentration of aluminum oxide is less than 0.5 mol percent is defined as a first region, and a region being outside of the first region in the radial direction in which the difference between the concentration of diphosphorus pentaoxide and the concentration of aluminum oxide is equal to or greater than 0.5 mol percent is defined as a second region, the ratio of the second region to the total of the first region and the second region is 50 percent or greater.

6. The optical fiber according to claim 5, wherein, in the first region, the concentration of diphosphorus pentaoxide and the concentration of aluminum oxide are substantially the same.

* * * * *